US008482603B2

(12) United States Patent
Wu et al.

(10) Patent No.: US 8,482,603 B2
(45) Date of Patent: Jul. 9, 2013

(54) DEVICE AND METHOD FOR 3-D DISPLAY CONTROL

(75) Inventors: Wen-Che Wu, Hsin Chu County (TW); Wen-Hsia Kung, Tao Yuan County (TW)

(73) Assignee: Realtek Semiconductor Corp., Hsinchu (TW)

( * ) Notice: Subject to any disclaimer, the term of this patent is extended or adjusted under 35 U.S.C. 154(b) by 227 days.

(21) Appl. No.: 13/179,810

(22) Filed: Jul. 11, 2011

(65) Prior Publication Data

US 2012/0007861 A1   Jan. 12, 2012

(30) Foreign Application Priority Data

Jul. 9, 2010   (TW) .............................. 99122746 A

(51) Int. Cl.
H04N 7/12      (2006.01)
H04N 11/02     (2006.01)
H04N 11/04     (2006.01)
H04N 9/47      (2006.01)

(52) U.S. Cl.
USPC ........................................ 348/53; 348/435.1

(58) Field of Classification Search
None
See application file for complete search history.

(56) References Cited

U.S. PATENT DOCUMENTS 8,300,087 B2 * 10/2012 Hulyalkar et al. .............. 348/43

* cited by examiner

*Primary Examiner* — David Czekaj
*Assistant Examiner* — Nam Pham
(74) *Attorney, Agent, or Firm* — Muncy, Geissler, Olds & Lowe, PLLC

(57) ABSTRACT

A representative Device and Method for 3-D Display Control is disclosed. The method for controlling stereo image display is disclosed. That is, to receive an image input signal wherein the image input signal includes a first refresh rate; to convert a frame rate of the image input signal to generate an image output signal, wherein the image output signal includes a second refresh rate which is higher than the first refresh rate, and includes a first image signal, a first VBI (Vertical Blanking Interval), a second image signal, a second VBI, a third image signal and a third VBI; to output a control signal for a left eye shutter of shutter glasses during a duration between the first VBI and a part of the second image signal; and to output a control signal for a right eye shutter of the shutter glasses during a duration between a part of the third image signal and the third VBI.

9 Claims, 3 Drawing Sheets

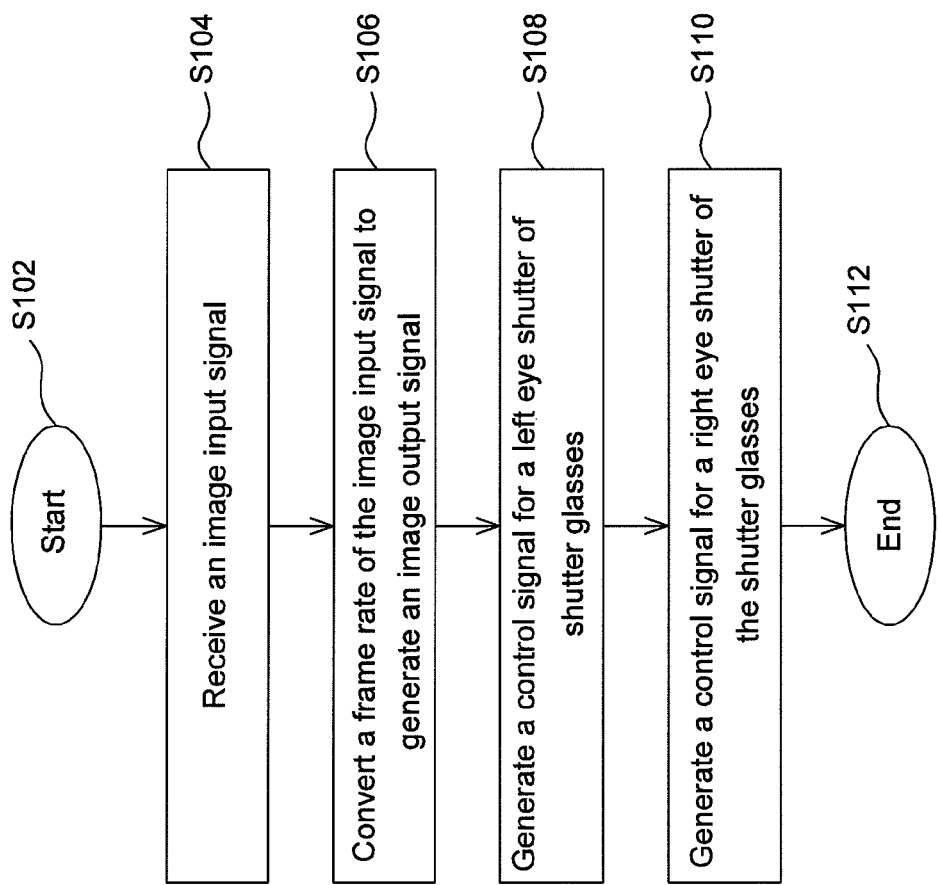

DEVICE AND METHOD FOR 3-D DISPLAY CONTROL

This application claims the benefit of the filing date of Taiwan Application Ser. No. 099122746, filed on Jul. 9, 2010, the content of which is incorporated herein by reference.

BACKGROUND (a) Technical Field

The invention relates to a display device and control method thereof.

(b) Description of the Related Art

In general, stereo viewing (e.g. 3-D (3-dimensional) image, etc.) involves a display of separate content for the right and left eye. Specifically, stereo viewing requires the presentation of a separate image to the left and right eye. The left and right images of stereo viewing are presented in an alternating manner. Conventional CRT monitor and related displays use progressive scan along scan lines in a frame. CRT monitor controls shutter glasses for the left and right eye to alternately switch between a closed orientation and an open orientation so as to make the left image visible to the left eye and the right image to the right eye at appropriate time during progressive scan. Thus, CRT monitor and related displays may ensure a proper stereo viewing experience.

However, stereo viewing has not shown promise with liquid crystal display (LCD), whether flat-panel or in the form of a projector. Such left and right images being presented in an alternating manner, in a type of stereo viewing, is namely time sequential stereo. Time sequential stereo needs to update image frame sequentially in a monitor. Therefore, if the display control method for alternating shutter glasses of CRT monitor is adopted by LCD, it may cause 'ghosting' of the left image in the right view and vice versa due to a slow response time of pixels in LCD.

A prior US patent publication Ser. No. US2001/0029395 A1 discloses a method to overcome an unacceptable stereo viewing experience of LCD. The prior method controls a right eye shutter and left eye shutter of the shutter glasses simultaneously remain in the closed orientation in image update duration. Then, the prior method controls shutter glasses to be an open orientation for a predetermined eye until a full image of display content for such eye is available during a vertical blanking interval. Specifically, a left eye shutter is controlled to be an open orientation for the duration of a first vertical blanking interval, which follows receipt of display content intended for a left eye; and a right eye shutter is controlled to be an open orientation for the duration of a second vertical blanking interval, which follows receipt of display content intended for a right eye. The prior method needs to enlarge the vertical blanking interval so as to buffer display content received from a content source longer. Consequently, a new timing specification including enlarged vertical blanking interval needs to be designed for a display controller or a panel.

As stated above, prior 3-D image display method needs to use a specially made timing to control a monitor or a panel. If the prior method is introduced, manufacturers need to redesign circuitries of a display controller or a panel conforming to the specially made timing. Thus, elements can not be shared between displays or panels due to different specification of display control mechanism to thereby increase cost of stock and inventory of manufacturers.

BRIEF SUMMARY

In light of the above-mentioned problem, one objective is to provide a device and control method thereof for stereo (e.g. 3-D (3-dimensional) image, etc.) image display that can make the left/right eye receive a full image of display content intended for a left/right eye without enlarging duration of vertical blanking intervals.

One objective is to provide a device and control method thereof for stereo image display that can control a monitor or a panel with a general timing without enlarging the vertical blanking interval.

One objective is to provide a device and control method thereof for stereo image display that is available to solve the abovementioned problems in the prior art.

According to an embodiment, a method for controlling stereo image display is disclosed. That is, to receive an image input signal wherein the image input signal includes a first refresh rate; to convert a frame rate of the image input signal to generate an image output signal, wherein the image output signal includes a second refresh rate which is higher than the first refresh rate, and includes a first image signal, a first VBI (Vertical Blanking Interval), a second image signal, a second VBI, a third image signal and a third VBI; to output a control signal for a left eye shutter of shutter glasses during a duration between the first VBI and a part of the second image signal; and to output a control signal for a right eye shutter of the shutter glasses during a duration between a part of the third image signal and the third VBI.

According to another embodiment, a method for controlling stereo image display includes following steps of multiplying a frame refresh rate by a predetermined number to change frame numbers conforming to the predetermined number in a predetermined duration; and separating each frame into a plurality of area, wherein a part of area is display content intended for a left eye and a part of area is display content intended for a right eye; wherein in two sequential frames, a last area of the first frame and a first area of the second frame are the same display content for a predetermined eye, and the number of the plurality of area is related to the predetermined number; Further, if two areas of two sequential frames are display content intended for a left eye, generating a first control signal to control a left eye shutter being an open orientation; and if two areas of two sequential frames are display content intended for a right eye, generating a control signal to control a right eye shutter being an open orientation.

According to another embodiment, a display control device includes a display controller. The display controller receives an image input signal and converts a frame rate of the image input signal to generate an image output signal, wherein the image input signal includes a first refresh rate and the image output signal includes a second refresh rate which is higher than the first refresh rate, and includes a first image signal, a first VBI (Vertical Blanking Interval), a second image signal, a second VBI, a third image signal and a third VBI. Further, during a duration between the first VBI and a part of the second image signal, the display controller generates a control signal for a left eye shutter of shutter glasses; and during a duration between a part of the third image signal and the third VBI, the display controller generates a control signal for a right eye shutter of the shutter glasses.

BRIEF DESCRIPTION OF THE DRAWINGS

FIG. 1C is a flow chart illustrating an embodiment of a method for controlling stereo image display.

DETAILED DESCRIPTION

The following detailed description refers to the accompanying drawings which show, by way of illustration, various embodiments in which the invention may be practiced. These embodiments are described in sufficient detail to enable those skilled in the art to practice these and other embodiments. The various embodiments are not necessarily mutually exclusive, as some embodiments can be combined with one or more other embodiments to form new embodiments. The following detailed description is, therefore, not to be taken in a limiting sense.

Figures 1A, 1B:
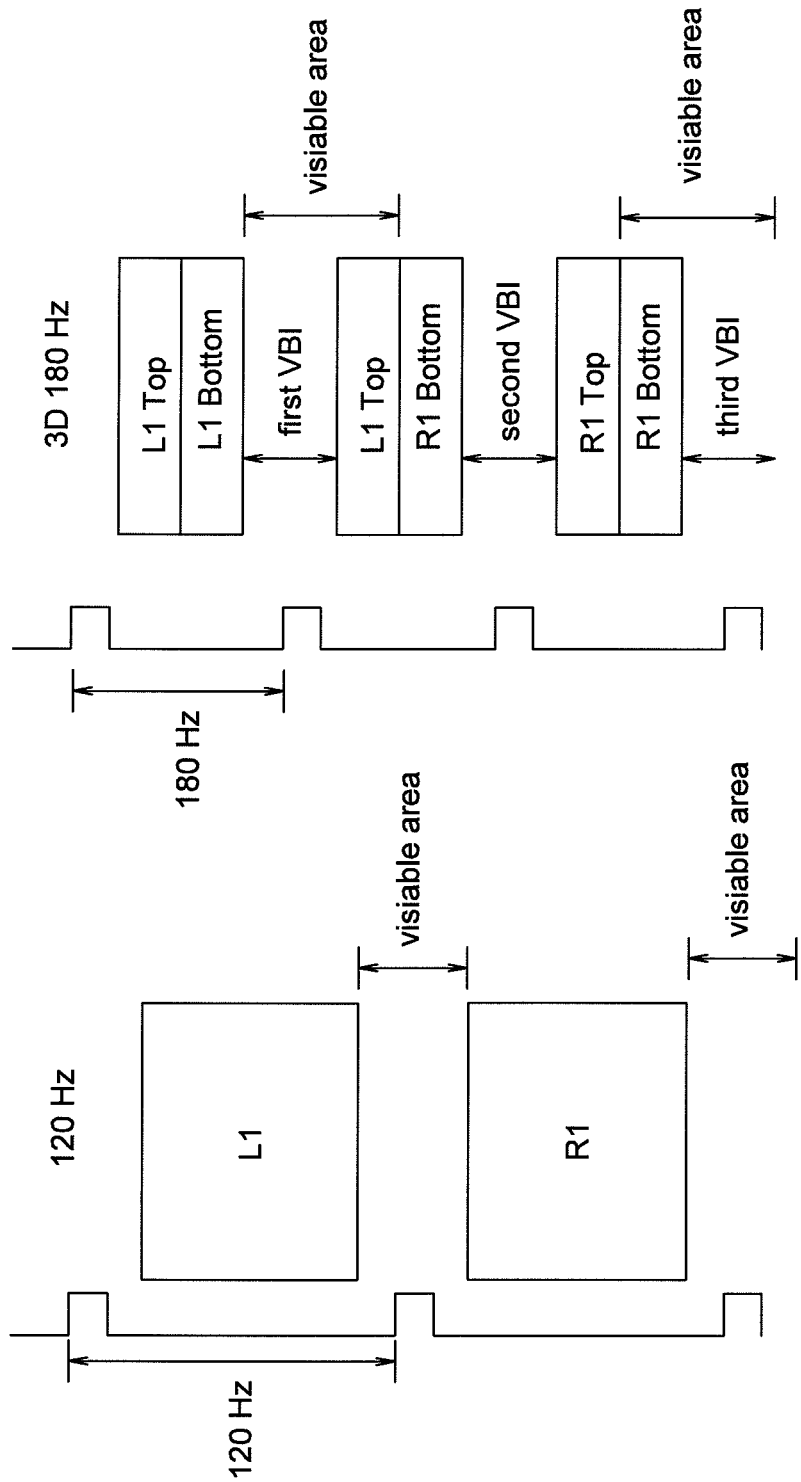
FIG. 1A is a schematic diagram illustrating a timing with an alternating left and right eye image of prior art.
FIG. 1B is a schematic diagram illustrating a timing with an alternating left and right eye image of an embodiment.

FIG. 1A is a schematic diagram illustrating a timing with an alternating left and right eye image of prior art. A conventional display presents image frames in stereo (e.g. 3-D (3-dimensional) image) image sequential mode (displaying alternating a left and right eye image L1, L2) and also controls shutter glasses to determine which eye sees the image being exhibited at the moment, thereby creating a stereoscopic image. Thus, in the conventional stereo image sequential mode, the left eye image L1 and the right eye image R1 occupy a frame separately in different time as shown in FIG. 1A.

For example, as shown in FIG. 1A, for reaching 60 Hz frame refresh rate, stereo viewing needs to convert a frame refresh rate to 120 Hz for the presentation of a separate image to the left and right eye separately. In the meantime, for properly display stereo image on LCD, conventional display method needs to increases frame rate for compressing time of frame display and enlarging duration of vertical blanking interval (VBI).

FIG. 1B is a schematic diagram illustrating a timing with an alternating left and right eye image of an embodiment. The timing may be used for enhancing a viewing experience when display content is viewed utilizing stereo glasses, in accordance with an embodiment. Of course, however, the timing may be used in any desired environment. In the context of embodiments, such display content may include pixel-related information, images(s), and/or any other content or component thereof at any stage of processing capable of being displayed.

FIG. 1C is a flow chart illustrating an embodiment of a method for controlling stereo image display. The method is described referring to FIGS. 1B and 1C and includes the steps described below.

Step S102: Start.

Step S104: Receive an image input signal wherein the image input signal includes a first refresh rate. In an embodiment, if image input signal, as an example shown in FIG. 1A, includes a first refresh rate as 120 Hz.

Step S106: Convert a frame rate of the image input signal to generate an image output signal, wherein the image output signal includes a second refresh rate which is higher than the first refresh rate, and includes a first image signal, a first VBI (Vertical Blanking Interval), a second image signal, a second VBI, a third image signal and a third VBI. In an embodiment, the first refresh rate 120 Hz a may be increased by 1.5 times to generate an image output signal, as shown in FIG. 1B, include a second refresh rate 180 Hz. Please note that the frame rate conversion is well-known by the skilled in the art, embodiments of the invention does not describe the detail hereinafter.

Step S108: Generate a control signal for a left eye shutter of shutter glasses during a duration between the first VBI and a part of the second image signal. According to an embodiment, as shown in FIG. 1B, the control signal may switch the left eye shutter to an open orientation during a visible area of shutter glasses between the first VBI and a top area of the second image signal L1 TOP.

Step S110: Generate a control signal for a right eye shutter of the shutter glasses during a duration between a part of the third image signal and the third VBI. According to an embodiment, as shown in FIG. 1B, the control signal may switch the right eye shutter to an open orientation during a visible area of shutter glasses between a bottom area of the third image signal R1 Bottom and the third VBI.

Step S112: End.

The abovementioned method controls shutter glasses to be an open orientation during a vertical blanking interval and a part of a sequential image signal so as to follow receipt a full image of display content intended for a predetermined eye. Thus the method may buffer display content received from a content source longer to satisfy characteristics of a slow response time of pixels in LCD and solve prior problems of 'ghosting' of the image in the predetermined view without enlarging the vertical blanking interval.

Figure 2:
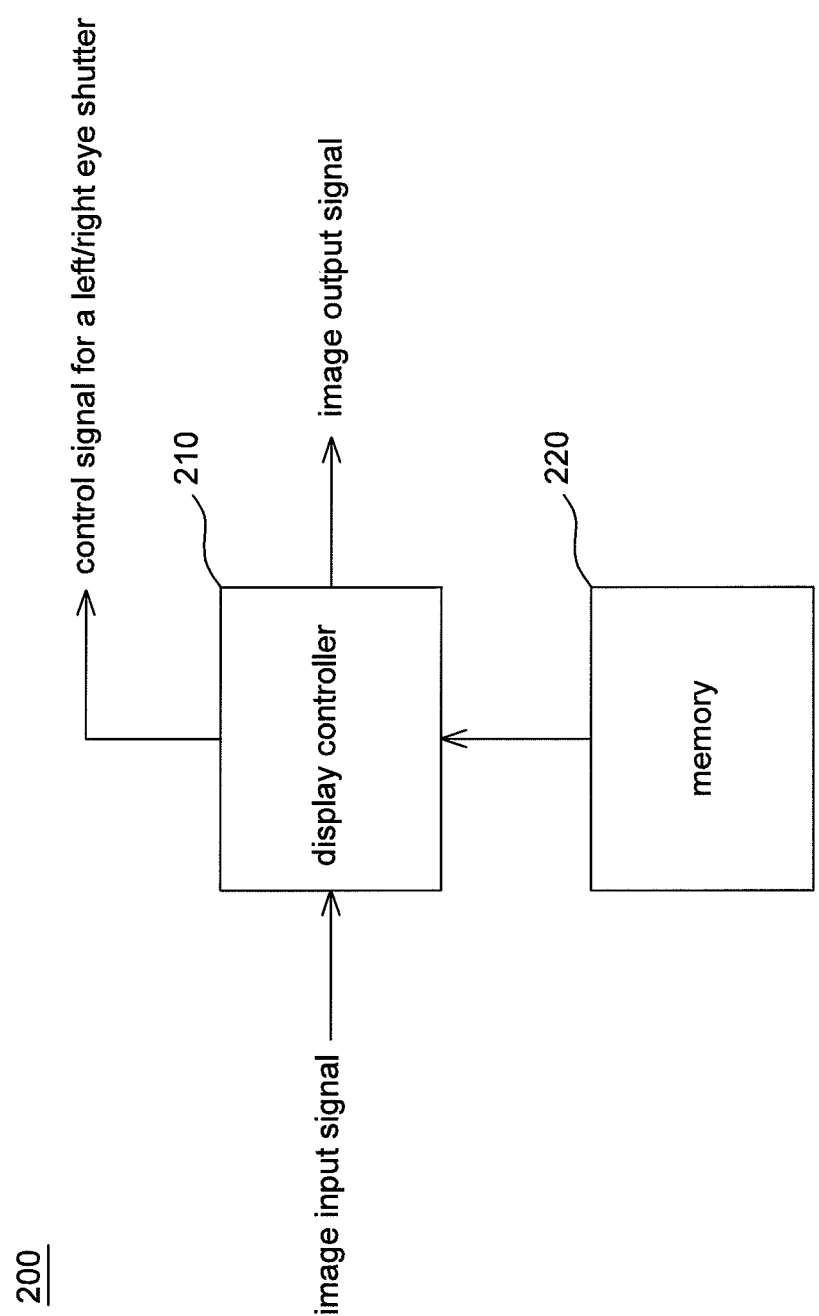
FIG. 2 shows a block diagram illustrating a frame rate conversion device of an embodiment.

FIG. 2 shows a block diagram illustrating a display control device 200 in which the various architecture and/or functionality of different embodiments may be implemented. The display of the display control device 200 may be in the form of a liquid crystal display (LCD), digital light processing (DLP) display, liquid crystal on silicon (LCOS) display, plasma display, or other similar display. Further, the display control device may be a frame rate conversion device.

According to an embodiment, the display control device 200 may include a display controller 210 and a memory 220. The memory 220 may be a plurality of line buffers or a frame buffer. The display controller 210 writes an image input signal into the memory 220 at a frame rate of 120 Hz and read the image signal in the memory 220 to generate an output signal at a frame rate of 180 Hz. In an embodiment, the memory 220 may be embedded in the display controller 210 or set as an extension of the display controller 210. Further, the memory 210 may be a DRAM, SRAM . . . etc, or various other kinds of memory.

The display control device 200 may operate with a pair of stereo glasses including a right eye shutter and a left eye shutter. The stereo glasses may be worn on a face of a user. The stereo glasses may be any kinds of constructions (e.g. eye glasses, member-less design, head strap and helmet, etc.) and may be used to provide similar or any other type of support. Further both the right eye shutter and left eye shutter are capable of being an open orientation or a closed orientation. Such orientations may be achieved by any desired mechanical, electrical, optical, and/or any other mechanism capable of carrying out the above functionality.

More illustrative information will now be set forth regarding various optional architecture and features with which the foregoing functionality may or may not be implemented, per the desires of the user. It should be strongly noted that the following information is set forth for illustrative purposes and should not be construed as limiting in any manner. Any of the following features may be optionally incorporated with or without the exclusion of other features described.

Please refer to FIGS. 1B and 2, if the display controller 210 increases a frame refresh rate of an image input signal by a predetermined number times to a frame refresh rate 180 Hz, it may change frame numbers of the image input signal conforming to the predetermined number in a predetermined duration. For instance, the display controller 210 may multiplying a frame refresh rate 120 Hz by a predetermined number 1.5 to generate a frame refresh rate 180 Hz. Thus two frames are changed to three frames within the same length of duration shown in FIGS. 1A and 1B.

Furthermore display controller 210 separates each frame stored in memory 220 into a plurality of area. A part of area is display content intended for a left eye (such as L1 Top and L1 Bottom) and another part of area is display content intended for a right eye (such as R1 Top and R1 Bottom). Please note that in two sequential frames, a last area of the first frame L1 Bottom (R1 Bottom) and a first area of the second frame L1 Top (R1 Top) are the same display content for a left eye (right eye) and the number of the plurality of area is related to the predetermined number.

In an embodiment of separating two frames into three frames within the same length of duration. As shown in FIG. 1B, the first and third frames at the rate of 180 Hz includes the same display content as the first and second frame at the rate of 120 Hz. Please note that the second frame at the rate of 180 Hz includes two areas of that: the first area is display content intended for a left eye appeared up the top of the second frame and the second area is display content intended for a right eye appeared down the button of the second frame. Specifically, after the first frame is received by a display, a full image of display content intended to a left eye is displayed. Further from the first VBI to the first area of the second frame L1 Top, a full image of display content intended to a left eye is continuously displayed. In the meantime, the left eye shutter can be in an open orientation and a left eye can see display content intended to a left eye. Please refer to FIG. 2, because two areas of the first frame and the first area of the second frame includes the same display content intended for a left eye, the display controller 210 generates a control signal for the left eye shutter during a duration between the first VBI and the first area of the second frame L1 Top to open the left eye shutter for a left eye viewing experience. According to this, the method of the embodiment allows a left eye has enough time to receive a full image of display content intended to a left eye to thereby eliminating 'ghosting' of the left image in the right view.

Similarly, after the third frame is received by a display, a full image of display content intended to a right eye is displayed. Further from the third VBI to the first area of the fourth frame L1 Top, a full image of display content intended to a right eye is continuously displayed. In the meantime, the right eye shutter can be in an open orientation and a right eye can see display content intended to a right eye. Please refer to FIG. 2, because two areas of the third frame and the first area of the fourth frame includes the same display content intended for a right eye, the display controller 210 generates a control signal for the right eye shutter during a duration between the third VBI and the first area of the fourth frame to open the right eye shutter for a right eye viewing experience. According to this, the method of the embodiment allows a right eye has enough time to receive a full image of display content intended to a right eye to thereby eliminating 'ghosting' of the right image in the left view.

The abovementioned embodiments can operate in accordance with general 3-D timing specification without enlarging period length of VBI.

Furthermore, an embodiment of a method may operate with reduce blanking timing specification. If panel does not provide with VBI compatible timing, the method can reduce the timing by two third refresh rate. For example, if the refresh rate is 120 Hz, an embodiment may operate with a reduced refresh rate 40 Hz for 3-D display.

Still yet, the architecture and/or functionality of the various above mentioned figures may be implemented in the context of a general computer system, a circuit board system, a game console system dedicated for entertainment purposes, an application-specific system, and/or any other desired system.

Those skilled in the art will readily observe that numerous modifications and alterations of the device and method may be made. For instance, the second frame in FIG. 1B may be divided by one third to include three areas. The first area of the three areas follows the first frame in FIG. 1B may include the same display content of left eye. That is to say, the method of the embodiment may separate a frame into a predetermined number of parts. These parts only needs to provide enough time for left or right eye to receive its intended display content and the operation timing of these parts needs to satisfy existing VBI specification. In other words, the method of embodiments does not limit to frequency of frame refresh rate. Accordingly, the above disclosure should be construed as limited only by the metes and bounds of the appended claims.

What is claimed is:

1. A display control method, comprising:
   receiving an image input signal wherein the image input signal includes a first refresh rate;
   converting the first frame rate of the image input signal to generate an image output signal, wherein the image output signal includes a second refresh rate which is higher than the first refresh rate, and includes a left or right image signal, a first VBI (Vertical Blanking Interval), a combined image signal, a second VBI, an other of the right or left image signal and a third VBI sequentially, wherein the combined image signal is generated according to the left image signal and the right image signal;
   generating a control signal for a left or right eye shutter of shutter glasses during a duration between the first VBI and a part of the combined image signal; and
   generating a control signal for a right or left eye shutter of the shutter glasses during a duration between a part of the right or left image signal and the third VBI.

2. The method according to claim 1, wherein the second refresh rate is higher than the first refresh rate by substantially 1.5 times.

3. The method according to claim 1, wherein a duration of the vertical blanking interval of the image output signal is not enlarged.

4. A display control device, comprising:
   a display controller for receiving an image input signal and converting a frame rate of the image input signal to generate an image output signal, wherein the image input signal includes a first refresh rate and the image output signal includes a second refresh rate which is higher than the first refresh rate, and includes a left or right image signal, a first VBI (Vertical Blanking Interval), a combined image signal, a combined VBI, an other of the right or left image signal and a third VBI sequentially, wherein the combined image signal is generated according to the left image signal and the right image signal;
   wherein during a duration between the first VBI and a part of the combined image signal, the display controller generates a control signal for a left or right eye shutter of shutter glasses; and
   wherein during a duration between a part of the right or left image signal and the third VBI, the display controller generates a control signal for a right or left eye shutter of the shutter glasses.

5. The device according to claim 4, wherein the second refresh rate is higher than the first refresh rate by substantially 1.5 times.

6. The device according to claim 4, wherein a duration of the vertical blanking interval of the image output signal is not enlarged.

7. A display control method, comprising:
processing a frame refresh rate of an image input signal by a predetermined number to change frame numbers of the image input signal conforming to the predetermined number in a predetermined duration, wherein the processed image input signal includes a left frame, a combined frame, and a right frame, wherein the combined frame is generated according to the left frame and the right frame; and
separating the combined frame of the processed image input signal into a plurality of area, wherein a part of area is display content intended for a left eye and another part of area is display content intended for a right eye;
wherein if two areas of two sequential frames are display content intended for a left eye, generating a first control signal to control a left eye shutter being an open orientation; and
wherein if two areas of two sequential frames are display content intended for a right eye, generating a control signal to control a right eye shutter being an open orientation;
wherein a vertical blanking interval of the processed image input signal is not enlarged;
wherein the first area of the combined frame is for a left eye and the last area of the combined frame is for a right eye; and generates a control signal to open a left eye shutter for a left eye to receive left image from the left frame to the first area of the combined frame as left eye image;
wherein the last area of the combined frame is for a right eye and a first area of a right frame is for a right eye; generates a control signal to open right eye shutter for a right eye to receive right image from the last area of the combined frame to the right frame as right eye image.

8. The method according to claim 7, wherein the predetermined number is greater than 1.

9. The method according to claim 7, wherein the predetermined number is 1.5.

* * * * *